United States Patent Office 3,494,922
Patented Feb. 10, 1970

---

3,494,922
PYRIMIDOQUINOLIN-1-ONES OR THIONES
William Blythe Wright, Jr., Woodcliff Lake, N.J., assignor to American Cyanamid Company, Stamford, Conn., a corporation of Maine
No Drawing. Filed June 16, 1967, Ser. No. 646,464
Int. Cl. C07d 57/20
U.S. Cl. 260—256.4      9 Claims

ABSTRACT OF THE DISCLOSURE

Substituted pyrimido[1,6-a]quinolin-1-one or thione, intermediates, acid addition salts and methods of preparing the same, are described. These compounds are useful as central nervous system (CNS) depressants and analgesics.

BRIEF SUMMARY OF THE INVENTION

The novel compounds of this invention may be illustrated by the following general formula:

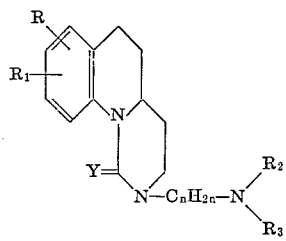

wherein R and $R_1$ are hydrogen, halogen, lower alkyl, lower alkoxy or trifluoromethyl; Y is oxygen or sulfur; $n$ is an integer 1, 2, 3, or 4; and $R_2$ and $R_3$ are hydrogen, lower alkyl, lower alkenyl, cyclohexyl benzyl and cyclopropylmethyl, and when —$NR_2R_3$ is taken together 1-pyrrolidinyl, lower alkyl-1-pyrrolidinyl, piperidino, lower alkylpiperidino, morpholino, lower alkylmorpholino, hexamethyleneimino, 1-piperazinyl, 1-(lower alkyl)-4-piperazinyl, and azabicyclo[3.2.2]nonan-3-yl; and when —$C_nH_{2n}NR_2R_3$ is taken together are (2-pyrrolidinyl)lower alkyl, (3-pyrrolidinyl)lower alkyl, (1-lower alkylpyrrolidinyl)lower alkyl, (1-benzylpyrrolidinyl)lower alkyl, [1-(halobenzyl)pyrrolidinyl]lower alkyl, [1-(lower alkoxybenzyl)pyrrolidinyl]lower alkyl, [1-(lower alkylbenzyl)pyrrolidinyl] lower alkyl, (piperidinyl)lower alkyl, (1-lower alkylpiperidinyl)lower alkyl, (1-benzylpiperidinyl)lower alkyl, [1-(halobenzyl)piperidinyl]lower alkyl, [1-(lower alkoxybenzyl)piperidinyl]lower alkyl, [1-(lower alkylbenzyl)piperidinyl]lower alkyl; and pharmaceutically acceptable acid addition salts thereof.

The free bases of this invention, in general, may be either liquids or solids at room temperature. The free bases are, in general, relatively insoluble in water, but soluble in most organic solvents such as lower alkyl alcohols and esters, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The novel compounds of this invention may be preferably prepared by starting with substituted quinoline derivatives. These are then converted to the intermediates such as 2,3,4,4a,5,6-hexahydro-1H-pyrimido[1,6-a]quinoline-1-one derivatives by methods similar to that described by M. Nagata, Yakugaku Zasshii 80, 1414 (1960).

The preferred method of preparing the compounds of the present invention can be illustrated as follows:

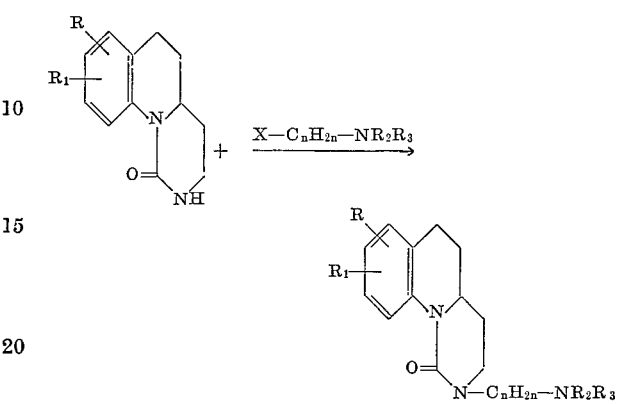

wherein R, $R_1$, $R_2$, $R_3$, and $n$ are as defined hereinbefore and X is a reactive halogen, lower alkylsulfonyloxy or arylsulfonyloxy group. The pyrimido[1,6-a]quinolin-1-one is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30°–200° C. for a period of from 30 minutes to 18 hours. The product can be recovered by methods well known in the art and described hereinafter in the examples.

A further method of preparing the present compounds can be illustrated by the following procedure:

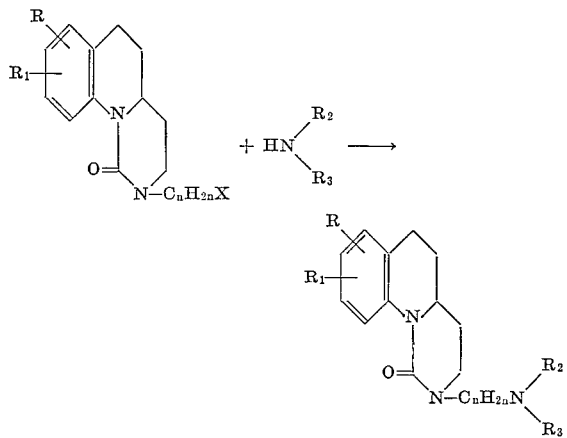

wherein R, $R_1$, $R_2$, $R_3$, and $n$ are as defined above and X is a halogen, alkylsulfonyloxy, or arylsulfonyloxy radical. The reaction takes place when the reagents are contacted in an inert solvent such as ether, tetrahydrofuran, toluene, benzene, and the like and the reagent mixture is maintained within the temperature of from about 35° to 150° C. for a period of 10 minutes to several hours.

The novel compounds of the present invention may also be prepared by several other methods, one of which is wherein a triamine precursor is reacted with a cyclizing agent, as for example, phosgene, ethyl chloroformate, N,N'-carbonyldiimidazole and the like to produce compounds having an oxygen in the 1-position. By using thiophosgene the corresponding compounds are produced wherein sulfur is present in the 1-position. These reactions may be illustrated as follows:

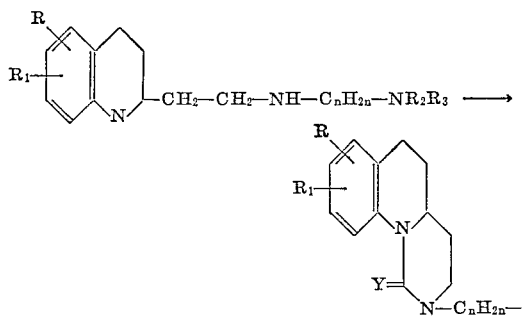

wherein R, R₁, R₂, R₃, Y and *n* are as defined hereinbefore. The reaction takes place when the reagents are mixed in an inert solvent such as ether, tetrahydrofuran, benzene, toluene, and the like, and the mixture is gradually heated to a temperature within the range of 35°–200° C. for a period of time sufficient to complete the reaction.

The compounds of the present invention show (CNS) depressant properties such as hypnotic and muscle relaxant type activity. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded interperitoneal doses of a compound. A median effective dose (RWD) is estimated. A test which indicates tranquilizing activity is represented by a measure of the reduction in motor activity. One-half this dose is given to a group of 5 mice and a 5 minute count of motor activity is recorded (actophotometer). Counts of $\lesssim$ 250 are considered to indicate a specific reduction (more than two standard deviations) of activity at a dose causing only minimal impairment of neurological function as measured by rod walking ability. Compounds that appeared to reduce motor activity ($\lesssim$ 250 count) are administered to additional groups of 5 mice at graded doses and tested similarly. The dose (MDD) which causes a 50% reduction of motor activity (a count of 250) is estimated. As a test for toxicity or margin of safety, the compounds that did specifically reduce motor activity are given to 10 mice at a dose of 10× MDD. The compounds that did not reduce motor activity are given to 10 mice at a dose of 4× RWD. If more than 50% of the mice die within 24 hours, the compound is rejected for reasons of toxicity or low margin of safety. If $\lesssim$ 50% of the mice die, the compound is considered a candidate for further study.

The present compounds are active as analgesics when tested by the procedure of E. Siegmund et al. Proc. Soc. Exptl. Biol. Med., vol. 95, p. 729 (1957). This method measures the inhibition of a "writhing syndrone" induced in mice by phenyl-p-quinone.

The products of the present invention as (CNS) depressants and analgesics can be incorporated in various pharmaceutical forms such as tablets, capsules, pills and so forth, for immediate or sustained release, by combining with suitable carriers. The daily dose may vary from 10 mg. to 1000 mg. They may be in the form of dosage units for single therapeutic dose or in small units for multiple dosages or in larger units for division into single doses. Obviously, in addition to the therapeutic tranquilizing compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

Example I.—Preparation of 2,3,4,4a,5,6-hexahydro-2-[2-(1-pyrrolidinyl)ethyl] - 1H - pyrimido[1,6-a]quinoline-1-one A mixture of 1.06 parts of 50% sodium hydride (in mineral oil) and 4.04 parts of 2,3,4,4a,5,6-hexahydro-1H-pyrimido[1,6-a]quinolin-1-one in 30 parts of diglyme is stirred under an atmosphere of nitrogen and a solution of 3.2 parts of 1-(2-chloroethyl)pyrrolidine in 30 parts of diglyme is added. The mixture is heated at reflux temperature for 5 hours, filtered to remove sodium chloride, and concentrated to remove the solvent. A mixture of 80 parts of 0.5 N hydrochloric acid and 200 parts of benzene is added to the residue. The mixture is shaken and the layers are separated. The aqueous layer is extracted once more with benzene and the benzene layers are discarded. The aqueous layer is treated with 10 parts of 5 N sodium hydroxide and the desired product is extracted into benzene. The benzene layer is washed with water and concentrated and the 2,3,4,4a,5,6-hexahydro-2-[2-(1-pyrrolidinyl)ethyl] - 1H-pyrimido[1,6-a]quinolin-1-one is obtained as an oil. When this material is dissolved in ethanol and fumaric acid is added, the fumarate salt, melting point 132–134° C. is obtained. This compound is active as a (CNS) depressant.

Example II.—Preparation of 2-(2-diethylaminoethyl)-2,3,4,4a,5,6-hexahydro - 1H - pyrimido[1,6-a]quinolin-1-one The above compound is obtained when 2-diethylaminoethyl chloride is substituted for 1-(2-chloroethyl)pyrrolidine in the procedure of Example I. The hydrochloride salt melts at 153°–155° C. This compound has (CNS) depressant activity.

Example III.—Preparation of 2-[2-(benzylmethylamino) ethyl]-2,3,4,4a,5,6-hexahydro - 1H - pyrimido[1,6-a] quinolin-1-one This compound is obtained as a viscous oil when 1-(2-chloroethyl)pyrrolidine is replaced by 2-(benzylmethylamino)ethyl chloride in the procedure described in Example I. This compound has (CNS) depressant activity.

Example IV.—Preparation of 2,3,4,4a,5,6-hexahydro-2-(2-methylaminoethyl)-1H-pyrimido[1,6-a]quinolin-1-one A mixture of 3.0 parts of 2-[2-(benzylmethylamino) ethyl]-2,3,4,4a,5,6 - hexahydro - 1H - pyrimido[1,6-a] quinolin-1-one, 100 parts of ethanol, 8 parts of 1 N hydrochloric acid and 1 part of 10% palladium-on-carbon catalyst is shaken in a Parr hydrogenator under a hydrogen pressure of about 3 atmospheres until reduction is complete. The catalyst is filtered off and the mother liquor is concentrated. The residue is treated with dilute sodium hydroxide and extracted with benzene to remove the desired product. The benzene layer is concentrated to obtain the 2,3,4,4a,5,6-hexahydro-2-(2-methylaminoethyl)-1H-pyrimido[1,6-a]quinolin-1-one, which is then converted to the fumarate salt, melting point 168–170° C. This compound has (CNS) depressant activity.

Example V.—Preparation of 2,3,4,4a,5,6-hexahydro-9-methyl-2-(2-piperidino-ethyl) - 1H - pyrimido[1,6-a] quinolin-1-one The above compound is obtained when 2,3,4,4a,5,6-hexahydro - 9 - methyl-1H-pyrimido[1,6-a]quinolin-1-one is treated with 1-(2-chloroethyl)piperidine by the procedure of Example I.

Example VI.—Preparation of 8,10-dichloro-2,3,4,4a,5,6-hexahydro - 2 - (3 - dimethylaminopropyl) - 1H - pyrimido[1,6-a]quinolin-1-one This compound is obtained when 8,10-dichloro-2,3,4,4a-5,6 - hexahydro - 1H - pyrimido[1,6, - a]quinolin - 1-one is treated with 3-dimethylaminopropyl chloride following the procedure of Example I.

Example VII.—Preparation of 7-fluoro-2,3,4,4a,5,6-hexahydro - 2 - (4 - morpholinobutyl) - 1H - pyrimido-[1,6-a]quinolin-1-one When 6 - fluoro - 2,3,4,4a,5,6 - hexahydro - 1H - pyrimido[1,6-a]quinolin-1-one and 4-morpholinobutyl bromide are reacted together following the procedure of Example I, the above compound is obtained.

Example VIII.—Preparation of 2,3,4,4a,5,6-hexahydro-8 - methoxy - 2 - [2 - (4 - methylpiperidino)ethyl]-1H-pyrimido[1,6-a]quinolin-1-one The above compound is obtained when 2,3,4,4a,5,6-hexahydro - 8 - methoxy - 1H - pyrimido[1,6 - a]quinolin-1-one is treated with 2-(4-methylpiperidino)ethyl chloride by the procedure of Example I.

Example IX.—Preparation of 2-[2-(allylcyclohexylamino)ethyl] - 2,3,4,4a,5,6 - hexahydro - 1H - pyrimido-[1,6-a]quinolin-1-one This compound is obtained when 2,3,4,4a,5,6-hexahydro-1H-pyrimido[1,6-a]quinolin-1-one and 2-(allylcyclohexylamino)ethyl chloride are reacted together following the procedure of Example I.

Example X.—Preparation of 2-[2-(cyclopropylmethylmethylamino)ethyl] - 2,3,4,4a,5,6 - hexahydro - 8 - trifluoromethyl-1H-pyrimido[1,6-a]quinolin-1-one When 2,3,4,4a,5,6 - hexahydro - 8 - trifluoromethyl-1H-pyrimido[1,6-a]quinolin-1-one is treated with 2-(cyclopropylmethylmethylamino)ethyl chloride by the procedure of Example I, the above compound is obtained.

Example XI.—Preparation of 8-bromo-2,3,4,4a,5,6-hexahydro - 2 - [2 - 1 - pyrrolidinyl) - ethyl] - 1H - pyrimido[1,6-a]quinolin-1-one The above compound is obtained when 8-bromo-2,3,4,-4a,5,6 - hexahydro - 1H - pyrimido[1,6 - a]quinolin - 1-one is treated with 1-(2-chloroethyl)pyrrolidine by the procedure of Example I. The hydrochloride salt melts at 259–261° C.

Example XII.—Preparation of 8-chloro-2-(2-ethylmethylaminoethyl) - 2,3,4,4a,5,6 - hexahydro - 1H - pyramido-[1,6-a]quinolin-1-one This compound is obtained when 8-chloro-2,3,4,4a5,6-hexahydro - 1H - pyrimido[1,6 - a]quinolin - 1 - one and 2-(ethylmethylamino)ethyl chloride are reacted as described in Example I.

Example XIII.—Preparation of 2,3,4,4a,5,6-hexahydro-2-(piperidinomethyl) - 1H - pyrimido[1,6 - a]quinolin-1-one A mixture of 2.0 parts of 2,3,4,4a,5,6-hexahydro-1H-pyrimido[1,6-a]quinolin-1-one, 0.85 part of piperidine, 30 parts of ethanol and 0.8 part of 37% formaldehyde is heaterd at reflux temperature for 2 hours. The solvent is then evaporated off and the 2,3,4,4a,5,6-hexahydro-2-(piperidinomethyl)-1H-pyrimido[1,6-a]quinolin-1-one is obtained.

Example XIV.—Preparation of 2,3,4,4a,5,6-hexahydro-2-[2 - (3 - methyl - 1 - pyrrolidinyl) - ethyl] - 1H - pyrimido[1,6-a]quinolin-1-one The above compound is obtained when 2,3,4,4a,5,6-hexahydro-1H-pyrimido-[1,6-a]quinolin-1-one is treated with 2-(3-methyl-1-pyrrolidinyl)ethyl chloride using the procedure of Example I.

Example XV.—Preparation of 2-[2-(2,6-dimethylmorpholino)ethyl] - 2,3,4,4a,5,6 - hexahydro - 1H - pyrimido-[1,6-a]quinolin-1-one When 2,3,4,4a,5,6 - hexahydro - 1H - pyrimido[1,6 - a]quinolin-1-one is treated with 2-(2,6-dimethylmorpholino)ethyl chloride, following the procedure of Example I, the above compound is obtained.

Example XVI.—Preparation of 2,3,4,4a,5,6-hexahydro-2-(2 - hexamethyleniminoethyl) - 1H - pyrimido[1,6 - a]-quinolin-1-one This compound is obtained when 2-hexamethyleniminoethyl chloride is reacted with 2,3,4,4a,5,6-hexahydro-1H-pyrimido[1,6-a]quinolin-1-one by the procedure of Example I.

Example XVII.—Preparation of 2-[2-(4-ethyl-1-piperazinyl)ethyl] - 2,3,4,4a,5,6 - hexahydro - 1H - pyrimido[1,6-a]quinolin-1-one The above compound is obtained when 2,3,4,4a,5,6-hexahydro - 1H - pyrimido[1,6 - a]quinolin - 1 - one is contacted with 2-(4-ethyl-1-piperazinyl)ethyl chloride following the procedure of Example I.

Example XVIII.—Preparation of 2-[2-(azabicyclo[3.2.2]-nonan - 3 - yl)ethyl] - 2,3,4,4a,5,6 - hexahydro - 1H-pyrimido[1,6-a]quinolin-1-one When 2,3,4,4a,5,6 - hexahydro - 1H - pyrimido[1,6 - a]-quinolin-1-one is treated with 2-(azabicyclo[3.2.2]nonan-3-yl)ethyl chloride using the procedure of Example I, the above compound is obtained.

Example XIX.—Preparation of 2-[(1-ethyl-3-pyrrolidinyl)methyl] - 2,3,4,4a,5,6 - hexahydro - 1H - pyrimido-[1,6-a]quinolin-1-one The above compound is obtained when 1-ethyl-3-pyrrolidinylmethyl chloride is contacted with 2,3,4,4a,5,6-hexahydro-1H-pyrimido[1,6-a]quinolin-1-one by the procedure of Example I.

Example XX.—Preparation of 2,3,4,4a,5,6-hexahydro-2-[2-(1-methyl-2-pyrrolidinyl)ethyl] - 1H - pyrimido[1,6-a]quinolin-1-one This compound is obtained when 2-(1-methyl-2-pyrrolidinyl)ethyl chloride is contacted with 2,3,4,4a,5,6-hexahydro-1H-pyrimido[1,6-a]quinolin - 1 - one by the procedure of Example I.

Example XXI.—Preparation of 2-[(1-benzyl - 3 - pyrrolidinyl)methyl]-2,3,4,4a,5,6-hexahydro - 1H - pyrimido [1,6-a]quinolin-1-one When 1-benzyl-3-pyrrolidinylmethyl chloride is substituted for 1-(2-chloroethyl)pyrrolidine in the procedure of Example I, the above compound is obtained.

Example XXII.—Preparation of 2-[(1-p-chlorobenzyl-3-pyrrolidinyl)methyl] - 2,3,4,4a,5,6 - hexahydro - 1H-pyrimido[1,6-a]quinolin-1-one If 1-p-chlorobenzyl-3-pyrrolidinylmethyl chloride is substituted for 1-(2-chloroethyl)pyrrolidine in the procedure of Example I, the above compound is obtained.

Example XXIII.—Preparation of 2-[(1-m-bromobenzyl-3-pyrrolidinyl)methyl]-2,3,4-4a,5,6 - hexahydro - 1H-pyrimido[1,6-a]quinolin-1-one The above compound is obtained when 1-m-bromobenzyl-3-pyrrolidinylmethyl bromide is substituted for 1-(2-chloroethyl)pyrrolidine in the procedure of Example I.

Example XXIV.—Preparation of 2 - [(1-p-ethylbenzyl-3-pyrrolidinyl)methyl] - 2,3,4,4a,5,6 - hexahydro - 1H-pyrimido[1,6-a]quinolin-1-one This compound is obtained when 1-p-ethylbenzyl-3-pyrrolidinylmethyl chloride is substituted for 1-(2-chloroethyl)pyrrolidine in the procedure of Example I.

Example XXV.—Preparation of 2,3,4,4a,5,6-hexahydro-2-[(1-p-methoxybenzyl-3 - pyrrolidinyl)methyl] - 1H-pyrimido[1,6-a]quinolin-3-one When 1-p-methoxybenzyl-3-pyrrolidinylmethyl chloride is substituted for 1-(2-chloroethyl)pyrrolidine in the procedure of Example I, the above compound is obtained.

Example XXVI.—Preparation of 2,3,4,4a,5,6-hexahydro-2-[(3 - pyrrolidinyl)methyl] - 1H - pyrimido[1,6-a]quinolin-3-one A mixture of 10 parts of 2-[(1-benzyl-3-pyrrolidinyl)methyl]-2,3,4,4a,5,6 - hexahydro - 1H - pyrimido[1,6-a]quinolin-3-one, 100 parts of 90% ethanol and 2 parts of 10% palladium-on-carbon catalyst is shaken in a Parr hydrogenator under a hydrogen atmosphere until hydrogenolysis is complete. The reaction mixture is filtered to remove the catalyst, and the mother liquor is concentrated to remove the solvent and the 2,3,4,4a,5,6-hexahydro-2-[(3-pyrrolidinyl)methyl]-1H - pyrimido[1,6 - a]quinolin-3-one is recovered.

Example XXVII.—Preparation of 2,3,4,4a,5,6-hexahydro-2-[(1 - methyl-3 - piperidinyl)methyl] - 1H - pyrimido[1,6-a]quinolin-1-one The above compound is obtained when 1-methyl-3-piperidinylmethyl chloride is substituted for 1-(2-chloroethyl)pyrrolidine in the procedure of Example I.

Example XXVIII.—Preparation of 2-[(1-benzyl-3-piperidinyl)methyl]-2,3,4,4a,5,6-hexahydro - 1H - pyrimido[1,6-a]quinolin-1-one If 1-benzyl-3-piperidinylmethyl chloride is substituted for 1-(2-chloroethyl)pyrrolidine in the procedure of Example I, the above compound is obtained.

Example XXIX.—Preparation of 2,3,4,4a,5,6-hexahydro-2-[(3-piperidinyl)methyl]-1H - pyrimido[1,6-a]quinolin-3-one The above compound is obtained when 2-[(1-benzyl-3-piperidinyl)methyl]-2,3,4,4a,5,6-hexahydro-1H - pyrimido[1,6-a]quinolin-1-one is reduced by the procedure of Example XXVI.

Example XXX.—Preparation of 2-[(1-p-chlorobenzyl-3-piperidinyl)methyl]-2,3,4,4a,5,6-hexahydro - 1H - pyrimido[1,6-a]quinolin-1-one When 1-p-chlorobenzyl-3-piperidinylmethyl chloride is substituted for 1-(2-chloroethyl)pyrrolidine in the procedure of Example I, the above compound is obtained.

Example XXXI.—Preparation of 2-[2-(1-m-bromobenzyl-2-piperidinyl)ethyl]-2,3,4,4a,5,6-hexahydro - 1H - pyrimido [1,6-a]quinolin-1-one This compound is obtained when 2-(1-m-bromobenzyl-2-piperidinyl)ethyl chloride is substituted for 1-(2-chloroethyl)pyrrolidine in the procedure of Example I.

Example XXXII.—Preparation of 2,3,4,4a,5,6-hexahydro-2-[(1-p-methoxybenzyl - 3 - piperidinyl)methyl] - 1H-pyrimido[1,6-a]quinolin-1-one If 1-p-methoxybenzyl-3-piperidinylmethyl chloride is substituted for the 1-(2-chloromethyl)pyrrolidine in the procedure of Example I, the above compound is obtained.

Example XXXIII.—Preparation of 2-[(1-p-ethylbenzyl-3-piperidinyl)methyl]-2,3,4,4a,5,6-hexahydro - 1H - pyrimido[1,6-a]quinolin-1-one The above compound is obtained when 1-p-ethylbenzyl-3-piperidinylmethyl chloride is substituted for the 1-(2-chloroethyl)pyrrolidine in the procedure of Example I.

Example XXXIV.—Preparation of 9-chloro-2,3,4,4a,5,6-hexahydro-2-[2-(1-pyrrolidinyl)ethyl] - 1H - pyrimido[1,6-a]quinolin-1-one When 9-chloro-2,3,4,4a,5,6-hexahydro - 1H - pyrimido[1,6-a]quinolin-1-one is treated with 1-(2-chloroethyl)pyrrolidine by the procedure of Example I, the above compound is obtained.

Example XXXV.—Preparation of 9-chloro-2 - (2 - ethylmethylaminoethyl)-2,3,4,4a,5,6-hexahydro - 1H - pyrimido[1,6-a]quinolin-1-one The above compound is obtained if 2-ethylmethylaminoethyl chloride is contacted with 9-chloro-2,3,4,4a,5,6-hexahydro-1H-pyrimido[1,6-a]quinolin-1-one by the procedure of Example I.

Example XXXVI.—Preparation of 2,3,4,4a,5,6-hexahydro-2-[2-(1-pyrrolidinyl)ethyl] - 1H - pyrimido[1,6-a]quinolin-1-thione A mixture of 1 part of 2,3,4,4a,5,6-hexahydro-2-[2-(1-pyrrolidinyl)ethyl]-1H-pyrimido[1,6-a]quinolin-1 - one, 1 part of phosphorus pentasulfide and 10 parts of xylene is heated at reflux temperature for 30 hours. A mixture of 50 parts of benzene and 17 parts of 2 N sodium hydroxide is added and the mixture is warmed and triturated until the product dissolves in the organic layer. The organic layer is washed with water and concentrated to remove the solvent. The residue is mixed with 15 parts of 1 N hydrochloric acid and filtered. The filtrate is treated with 4 parts of 5 N sodium hydroxide and extracted with benzene. The benzene layer is concentrated in order to recover the 2,3,4,4a,5,6-hexahydro-2-[2-(1-pyrrolidinyl)ethyl] - 1H-pyrimido[1,6-a]quinolin-1-thione.

I claim:

1. A pyrimido[1,6-a]quinoline selected from those of the formula:

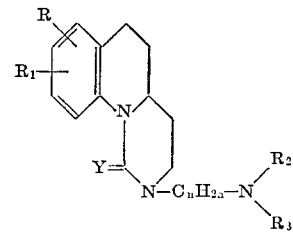

wherein R and $R_1$ are selected from the group consisting of hydrogen, halogen, lower alkyl, lower alkoxy and trifluoromethyl; Y is selected from the group consisting of oxygen and sulfur; $n$ is an integer 1, 2, 3, or 4; and $R_2$ and $R_3$ are selected from the group consisting of hydrogen, lower alkyl, lower alkenyl, cyclohexyl, benzyl and cyclopropylmethyl, and when —$NR_2R_3$ is taken together it is selected from the group consisting of 1-pyrrolidinyl, lower alkyl-1-pyrrolidinyl, piperidino, lower alkyl-piperidino, morpholino, lower alkylmorpholino, hexamethyleneimino, 1-piperazinyl, 1-(loweralkyl)-4-piperazinyl, and azabicyclo[3.2.2]nonan-3-yl; and when —$C_nH_{2n}NR_2R_3$ is taken together it is selected from the group consisting of (2-pyrrolidinyl)lower alkyl, (3-pyrrolidinyl)lower alkyl, (1-lower alkylpyrrolidinyl)lower alkyl, (1-benzylpyrrolidinyl)lower alkyl, [1-(halobenzyl)-pyrrolidinyl]lower alkyl, [1-(lower alkoxybenzyl)pyrrolidinyl]lower alkyl, [1-(lower alkylbenzyl)pyrrolidinyl] lower alkyl, (piperidinyl)lower alkyl (1-lower alkylpiperidinyl)lower alkyl, (1-benzylpiperidinyl)lower alkyl, [1-(halobenzyl)piperidinyl]lower alkyl, [1-(lower alkoxybenzyl)piperidinyl]lower alkyl and [1-(lower alkylbenzyl)piperidinyl]lower alkyl; and pharmaceutically acceptable acid addition salts thereof.

2. The pyrimido[1,6-a]quinoline according to claim 1: 2,3,4,4a,5,6 - hexahydro-2-[2-(1-pyrrolidinyl)ethyl]-1H-pyrimido[1,6-a]quinolin-1-one.

3. The pyrimido[1,6-a]quinoline according to claim 1: 2 - (2-diethylaminoethyl)-2,3,4,4a,5,6-hexahydro-1H-pyrimido[1,6-a]quinolin-1-one.

4. The pyrimido[1,6-a]quinoline according to claim 1: 2-[2-(benzylmethylamino)ethyl] - 2,3,4,4a,5,6 - hexahydro-1H-pyrimido[1,6-a]quinolin-1-one.

5. The pyrimido[1,6-a]quinoline according to claim 1: 2,3,4,4a,5,6-hexahydro - 2 - (2-methylaminoethyl)-1H-pyrimido[1,6-a]quinolin-1-one.

6. The pyrimido[1,6-a]quinoline according to claim 1: 8-bromo - 2,3,4,4a,5,6 - hexahydro-2-[2-(1-pyrrolidinyl)-ethyl]-1H-pyrimido[1,6-a]quinolin-1-one.

7. The pyrimido[1,6-a]quinoline according to claim 1: 8-chloro - 2 - (2-ethylmethylaminoethyl)-2,3,4,4a,5,6-hexahydro-1H-pyrimido[1,6-a]quinolin-1-one.

8. The pyrimido[1,6-a]quinoline according to claim 1: 9-chloro - 2 - (2-ethylmethylaminoethyl)-2,3,4,4a,5,6-hexahydro-1H-pyrimido[1,6-a]quinolin-1-one.

9. The pyrimido[1,6-a]quinoline according to claim 1: 9-chloro - 2,3,4,4a,5,6 - hexahydro-2-[2-(1-pyrrolidinyl)-ethyl]-1H-pyrimido[1,6-a]quinolin-1-one.

References Cited

UNITED STATES PATENTS 3,021,331  2/1962  Lombardino et al. __ 260—256.4

ALEX MAZEL, Primary Examiner

R. J. GALLAGHER, Assistant Examiner

U.S. Cl. X.R.

260—247.1, 247.2, 251, 256.5; 424—251